Aug. 12, 1958     E. HAGENLOCHER     2,846,856
TORSIONALLY RESILIENT FLEXIBLE COUPLINGS
Original Filed Feb. 11, 1952
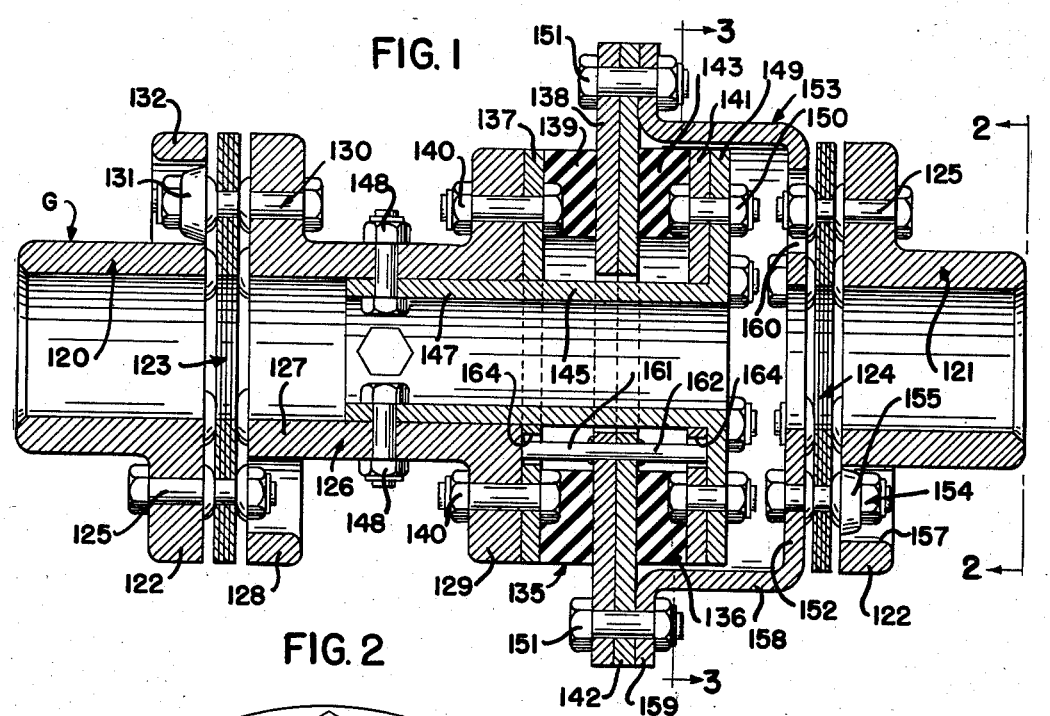
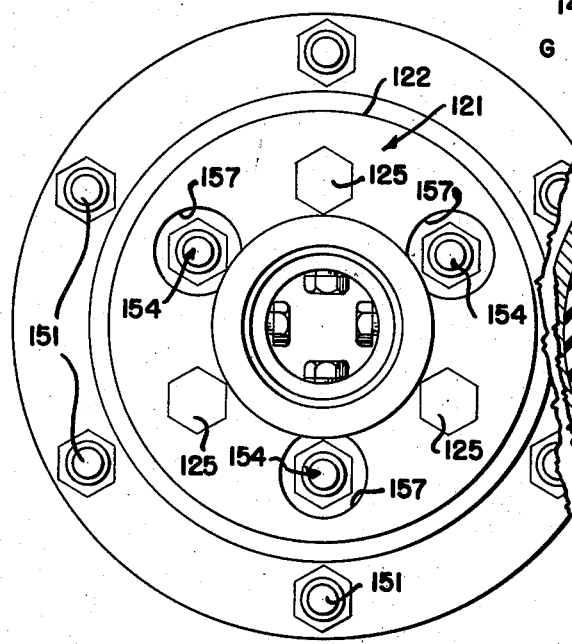
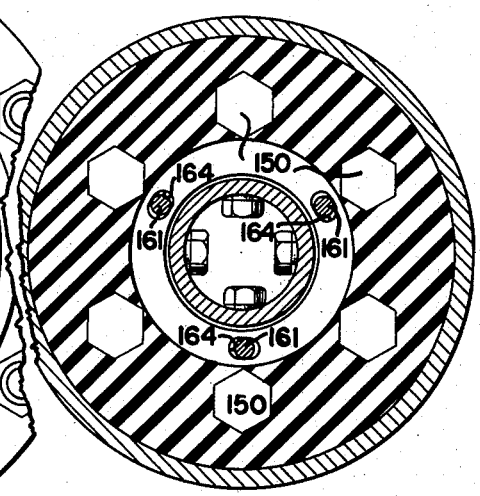
INVENTOR
Ernest Hagenlocher
BY
ATTORNEYS ര
United States Patent Office 2,846,856
Patented Aug. 12, 1958

2,846,856

TORSIONALLY RESILIENT FLEXIBLE COUPLINGS

Ernest Hagenlocher, Warren, Pa.

Original application February 11, 1952, Serial No. 271,008, now Patent No. 2,745,267, dated May 15, 1956. Divided and this application March 19, 1956, Serial No. 572,577

6 Claims. (Cl. 64—13)

This invention relates to improvements in torsionally resilient flexible couplings.

The present application is a division out of my parent application Serial No. 271,008, filed February 11, 1952 a part of which has issued as U. S. Patent 2,745,267, dated May 15, 1956.

The primary object of this invention is the provision of an improved flexible coupling of the general type shown in Patent 2,182,711 but including a torsionally resilient structure of the rubber sandwich type such as shown in my Patent 2,593,877, and additionally having an improved novel relationship of pairs of torsionally resilient members connected to a spool structure.

Other objects and advantages of this invention will be apparent during the course of the following detailed description.

In the accompanying drawing, forming a part of this specification, and wherein similar reference characters designate corresponding parts throughout the several views:

Figure 1 is a longitudinal cross sectional view taken through the improved coupling structure showing the arrangement of shaft coupling flanges, transversely flexible disc sets, spool structure, and novel relationship of torsion deflecting members.

Figure 2 is a fragmentary end elevation of the coupling of Figure 1 looking in the general direction 2—2 of Figure 1.

Figure 3 is a transverse cross sectional view taken substantially on the line 3—3 of Figure 1.

Referring to the coupling structure wherein a pair of rubber sandwiches are disposed in adjacent parallel relation between flexible steel disc sets, the letter G may generally designate the same. Two shaft coupling members or flanges 120 and 121 are provided, each including shaft attaching hubs and attaching flanges 122.

Referring to the form of invention G shown in Figures 1, 2 and 3, the same shows a spool type coupling structure having the rubber sandwiches thereof disposed in adjacent parallel relationship between the flexible steel disc sets.

In this coupling structure the shaft coupling members or flanges 120 and 121 each include hubs and the attaching flanges 122. The latter are connected to the flexible steel disc sets 123 and 124 by means of bolt assemblages 125. A spool 126 includes the cylindrical body portion 127 and the end flanges 128 and 129. The flange 128 may be connected by bolt assemblages 130 to the steel disc set 123, and each bolt assemblage 130 may include a safety bushing 131 operating in a clearance opening 132 of the flange 122.

Between the spool and the disc set 124 there are disposed a pair of rubber sandwiches 135 and 136. The rubber sandwich 135 includes the rigid steel plates 137 and 138 having the rubber core 139 bonded thereto. The plate 137 is connected by bolts 140 to the spool flange 129.

The other rubber sandwich 136 includes an end steel plate 141 and a complementary plate 142, between which the rubber core or ring 143 is disposed and bonded thereto. In order to prevent relative rotary movement of the plates 137 and 141 a connecting member 145 is provided. It includes a cylindrical body portion 147 disposed through the passageways of the two rubber sandwiches and entering the passageway of the spool 126 and secured to the hub 127 of the spool by bolts 148. At its opposite end the body 147 is provided with an annular flange 149 which is bolted at 150 to the plate 141 of the rubber sandwich 136. The two plates 138 and 142 of the rubber sandwiches which are of greater diameter than plates 137 and 141 are bolted together at 151. They are centrally apertured to permit free passage of the connecting member 145 therethrough.

The laminated steel disc set 124 is connected to an end plate 152 of a cup shaped connecting member 153. This connects the disc set 124 to the rubber sandwich plates 138 and 142. This plate 152 has bolt assemblages 154 connected to the disc set 124 and they have the safety bushing 155 extending into the clearance opening 157 of the flange 122, as shown in Figure 1. The connecting member 153 has the cylindrical body portion 158 extending in the direction of the rubber sandwiches and provided with an outwardly extending flange 159 which is secured to the plates 138 and 142 by the bolts 151 above described.

To lessen over-all length of the assemblage, the plate 152 may be apertured at 160 for receiving the nuts of the bolts 125. Of course the safety bolt assemblages and the other bolt assemblages which connect steel discs to their adjacent parts are circumferentially staggered, as will be obvious from Figure 2.

To limit torsional stresses put upon the rubber cores or rings, pins 161 are secured to the core plates 138 and 142 at 162, as shown in Figure 1; these pins extending across the spaces between complementary sandwich plates and at their free ends extending into oblong openings 164 in the plates 137 and 141.

It is to be noted that the plates 138 and 142 extend marginally beyond the complementary rubber sandwich plates and rubber cores.

Various changes in the shape, size and arrangement of parts may be made to the form of invention herein shown and described without departing from the spirit of the invention or scope of the claims.

I claim:

1. A flexible coupling structure comprising a pair of attaching coupling parts, a set of metal laminations bolted at the inner sides of each of said attaching coupling parts at space circumferential locations for the purpose of compensating for misalignment and end float, a spacing spool, bolts connecting said spacing spool to one of said sets of laminations at circumferentially spaced locations with respect to the bolts connecting said set to its attaching coupling part, and rubber sandwich means connected to and between the opposite end of said spool and the other set of laminations and connected to said other set, said sets of laminations being completely independent of the rubber sandwich means and axially spaced therefrom.

2. A flexible coupling structure comprising a pair of shaft attaching coupling parts, each including an attaching flange, two sets of transversely flexible laminated metal disc sets, one of each for the attaching flanges of the coupling parts bolt connected at the inner sides of said attaching flanges at spaced circumferential locations, a spool having end attaching flanges, said sets being respectively bolt connected to the attaching flanges of the spool at locations circumferentially spaced from those locations where said sets are bolt connected to the respective attaching flanges of the coupling parts, a pair of rubber sandwiches each of which includes a rubber sandwich core and side metal plates bonded with the core, means connecting the adjacent and facing plates of said rubber sandwiches together, means connecting the outer plate of one of said rubber sandwiches to the attaching flange of said spool remote from the above mentioned spool connected coupling part, means also connecting the outer plate of the other rubber sandwich to said spool, and means connecting the innermost attached plates of said sandwiches to the other transversely flexible laminated disc set at locations spaced from those locations where said other set is connected to its respective coupling attaching flange.

3. A coupling structure as defined in claim 2 in which the endmost attaching plate of the rubber sandwich most remote from said spool is connected to the hub portion of said spool.

4. A flexible coupling structure comprising a pair of shaft attaching parts, each of which has a hub and a radial attaching flange, two self contained sets of transversely flexible laminated disc sets in which the metal laminations of each set are in side to side surface contact in a unitary assemblage, one of said sets being provided for each coupling part and being connected at circumferential spaced locations to the inner sides of the respective attaching flanges, a spool located between said sets, said spool having a sleeve type hub structure and end radially extending attaching flanges, one of said disc sets being connected to an adjacent attaching flange of the spool at a location circumferentially spaced from the location where said set is connected to the respective attaching flange of the adjacent coupling part, a pair of rubber sandwiches each of which includes a rubber sandwich core and outer side metal plates bonded with the core and an inner plate structure to which said cores are both bonded, means rigidly connecting the outer plates of the rubber sandwiches to the spool to hold said sandwiches against relative rotation, and means connecting the plate structure of the rubber sandwiches which lies between the rubber cores to the second of said transversely flexible laminated disc sets at circumferentially spaced locations on said disc set spaced from locations where said second disc set is connected to its adjacent coupling attaching flange.

5. A coupling structure as defined in claim 4 in which the means which connects the outer plates of said rubber sandwiches against relative rotation comprises a sleeve which is rigidly connected to the hub of the spool and a radial flange which is connected to the outermost plate of the rubber sandwich most removed from said spool.

6. A coupling structure as defined in claim 4 in which the means which connects one of the coupling flanges to the plate structure between the rubber cores of said sandwiches comprises a cup-shaped structure which includes a plate connected to the said second laminated disc set and a cylindrical body portion directly connected to said plate structure between the cores, said cylindrical body portion receiving therein the core and outer plate of one of said rubber sandwiches.

References Cited in the file of this patent

UNITED STATES PATENTS 2,499,093     Fast _____ Feb. 28, 1950